United States Patent
Yamamoto

(10) Patent No.: US 7,955,745 B2
(45) Date of Patent: Jun. 7, 2011

(54) FUEL CELL SYSTEM AND ACTIVATION METHOD FOR FUEL CELL

(75) Inventor: Jun Yamamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/594,012

(22) PCT Filed: Jun. 6, 2008

(86) PCT No.: PCT/JP2008/060807
§ 371 (c)(1),
(2), (4) Date: Sep. 30, 2009

(87) PCT Pub. No.: WO2008/153111
PCT Pub. Date: Dec. 18, 2008

(65) Prior Publication Data
US 2010/0119887 A1    May 13, 2010

(30) Foreign Application Priority Data
Jun. 14, 2007 (JP) ................... 2007-157610

(51) Int. Cl.
*H01M 8/02* (2006.01)
*H01M 8/04* (2006.01)
*H01M 8/10* (2006.01)

(52) U.S. Cl. .............. 429/429; 429/445; 429/535

(58) Field of Classification Search .......... 429/429, 429/445, 535; 427/115
See application file for complete search history.

(56) References Cited

U.S. PATENT DOCUMENTS

| | | | |
|---|---|---|---|
| 4,756,718 A * | 7/1988 | Ueno et al. ............... | 29/623.5 |
| 5,601,936 A * | 2/1997 | Dudfield et al. ........... | 429/432 |
| 6,268,077 B1 * | 7/2001 | Kelley et al. ............. | 429/421 |
| 6,730,424 B1 * | 5/2004 | He et al. ................. | 429/432 |
| 6,881,510 B1 * | 4/2005 | Gyoten et al. ............ | 429/431 |
| 7,695,836 B2 * | 4/2010 | Lee ....................... | 429/432 |
| 2006/0019131 A1 | 1/2006 | Akiyama et al. | |
| 2007/0009773 A1 * | 1/2007 | Xie ....................... | 429/13 |

FOREIGN PATENT DOCUMENTS

| | | |
|---|---|---|
| JP | 6-196187 A | 7/1994 |
| JP | 2005-093143 A | 4/2005 |
| JP | 2006-040598 A | 2/2006 |
| JP | 2008-059960 A | 3/2008 |
| WO | 2008/026054 A1 | 3/2008 |

* cited by examiner

*Primary Examiner* — Gregg Cantelmo
(74) *Attorney, Agent, or Firm* — Fitzpatrick, Cella, Harper & Scinto

(57) ABSTRACT

A cell unit voltage is controlled such that a hydrogen production reaction is caused to occur in an oxidizer electrode, thereby allowing a current corresponding to a moving amount of protons, which is larger than a diffusion limiting current, to pass through a fuel cell. As a result, regardless of a supply amount of an oxidizer, a current larger than a limiting current of a fuel cell reaction is allowed to flow.

4 Claims, 11 Drawing Sheets

FUEL CELL SYSTEM AND ACTIVATION METHOD FOR FUEL CELL

TECHNICAL FIELD

The present invention relates to a fuel cell system including a fuel cell which performs power generation by supplying an oxidizer and a fuel to an oxygen electrode provided to one surface of a polymer electrolyte membrane and to a fuel electrode provided to another surface thereof, respectively.

BACKGROUND ART

A polymer electrolyte fuel cell basically includes a polymer electrolyte membrane having proton conductivity and a pair of electrodes arranged on both surfaces thereof. Each of the electrodes includes a catalyst layer mainly made of platinum or platinum-group metal catalyst, and a gas diffusion electrode which is formed on an outer surface of the catalyst layer and which serves to supply a gas and to collect a current. A body formed by integrating the electrodes and the polymer electrolyte membrane is called a membrane electrode assembly (MEA). A fuel (hydrogen) is supplied to one of the electrodes and an oxidizer (oxygen) is supplied to another of the electrodes, thereby performing power generation.

In the fuel electrode to which hydrogen is supplied as the fuel, a reaction expressed by the following (formula 1) occurs, and protons and electrons are produced from hydrogen. Further, in the oxidizer electrode to which oxygen is supplied as the oxidizer, a reaction expressed by the following (formula 2) occurs, and water is produced from oxygen, protons, and electrons. In this case, the protons move from the fuel electrode to the oxidizer electrode by passing through the polymer electrolyte membrane. Further, the electrons move from the fuel electrode to the oxidizer electrode by passing through an exterior load. In this process, electric power is obtained.

fuel electrode: $H_2 \rightarrow 2H^+ + 2e^-$ (formula 1)

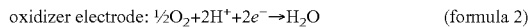

oxidizer electrode: $\frac{1}{2}O_2 + 2H^+ + 2e^- \rightarrow H_2O$ (formula 2)

A theoretical voltage of the fuel cell is about 1.23 V, but the fuel cell is often used at the voltage of 0.7 V in a normal operation state. The voltage drop occurs in relation to various losses (polarization) in the fuel cell.

For the polymer electrolyte membrane, a perfluorosulfonic acid polymer electrolyte membrane typified by Nafion (trademark of DuPont) is widely used. In the perfluorosulfonic acid polymer electrolyte membrane, for conducting the protons, water moving while entrained with the protons is necessary. Accordingly, in order to obtain sufficient proton conductivity, a moisture content of the polymer electrolyte membrane has to be increased. In this connection, it is known that, when the fuel cell is operated when the moisture content is low, a voltage of the fuel cell is reduced.

Further, it is known that, in a case where a potential of the oxidizer electrode of the fuel cell with respect to a potential of the fuel electrode is set to a high value equal to or higher than 0.8 V, an oxide layer is formed on a platinum catalyst surface used for the oxidizer electrode, thereby causing degradation in catalytic activity.

In order to suppress the voltage reduction of the fuel cell due to the above-mentioned causes and to keep characteristics of the fuel cell in a high and stable state from immediately after start of the operation, an activation method for the fuel cell is conventionally proposed.

The activation of the fuel cell herein refers to an operation of increasing a moisture content of the polymer electrolyte membrane and reducing loss (polarization) by removing an oxide layer formed on the catalyst surface.

Japanese Patent Application Laid-Open No. 2005-093143 discloses a method of activating a fuel cell by short-circuiting opposite electrodes of the fuel cell.

The voltage of the fuel cell is retained around 0 V, thereby reducing and removing the oxide layer formed on the platinum catalyst surface. Further, by allowing passage of a current generated by the fuel cell reaction, production of water is promoted, thereby humidifying the polymer electrolyte membrane.

In the activation method, it is impossible to pass through the fuel cell a current equal to or larger than a maximum current (hereinafter, referred to as limiting current) passed at a time of the steady operation.

Japanese Patent Application Laid-Open No. 2006-040598 discloses a method in which, in a fuel cell for supplying an organic fuel such as methanol to a fuel electrode, while an inert gas is supplied to an oxidizer electrode, the fuel cell is connected to an exterior power source such that potentials of the fuel electrode and the oxidizer electrode are inverted, thereby humidifying a polymer electrolyte membrane.

In this case, in the oxidizer electrode, by the protons moved from the fuel electrode through the polymer electrolyte membrane and the electrons supplied from the exterior power source, a hydrogen production reaction as expressed by a formula 3 occurs.

oxidizer electrode: $2H^+ + 2e^- \rightarrow H_2$ (formula 3)

In a process of the above-mentioned reaction, along with the movement of the protons, water is spread in the polymer electrolyte membrane, thereby performing the humidification. Further, since the potentials of the fuel electrode and the oxidizer electrode are inverted, the potential of the oxidizer electrode is retained to be lower than that of the fuel electrode, thereby promoting reduction and removal of the oxide layer formed on the platinum catalyst surface.

However, the activation described in Japanese Patent Application Laid-Open No. 2006-040598 is performed for a purpose of humidifying the polymer electrolyte membrane, and is still insufficient in terms of a point of enhancing the characteristics of the fuel cell in the entire current region used at a time of the steady operation.

DISCLOSURE OF THE INVENTION

The present invention is directed to a fuel cell system and an activation method for a fuel cell, in which an activation treatment is performed such that a current larger than a limiting current is allowed to flow, thereby enabling enhancement of characteristics of a fuel cell in an entire current region used at a time of steady operation.

The present invention provides a fuel cell system having the following structure and an activation method for a fuel cell.

That is, the present invention relates to a fuel cell system including:

a fuel cell which performs power generation by supplying an oxidizer to an oxidizer electrode provided on one surface of a polymer electrolyte membrane and supplying a fuel to a fuel electrode provided on another surface thereof, respectively; and a voltage application circuit for applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and for passing a current larger than a maximum current generated at a time of steady operation of the fuel cell.

Further, the present invention relates to an activation method for a fuel cell which performs power generation by supplying an oxidizer to an oxidizer electrode provided on one surface of a polymer electrolyte membrane and supplying a fuel to a fuel electrode provided on another surface thereof, respectively, the activation method including:

performing an activation treatment including applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and for passing a current larger than a maximum current generated at a time of steady operation of the fuel cell.

In the activation method for a fuel cell of the present invention, a current larger than the limiting current is allowed to pass through the fuel cell, thereby enabling enhancement of power generation characteristics in an entire current region used at a time of the steady operation.

BEST MODE FOR CARRYING OUT THE INVENTION

Figure 1:
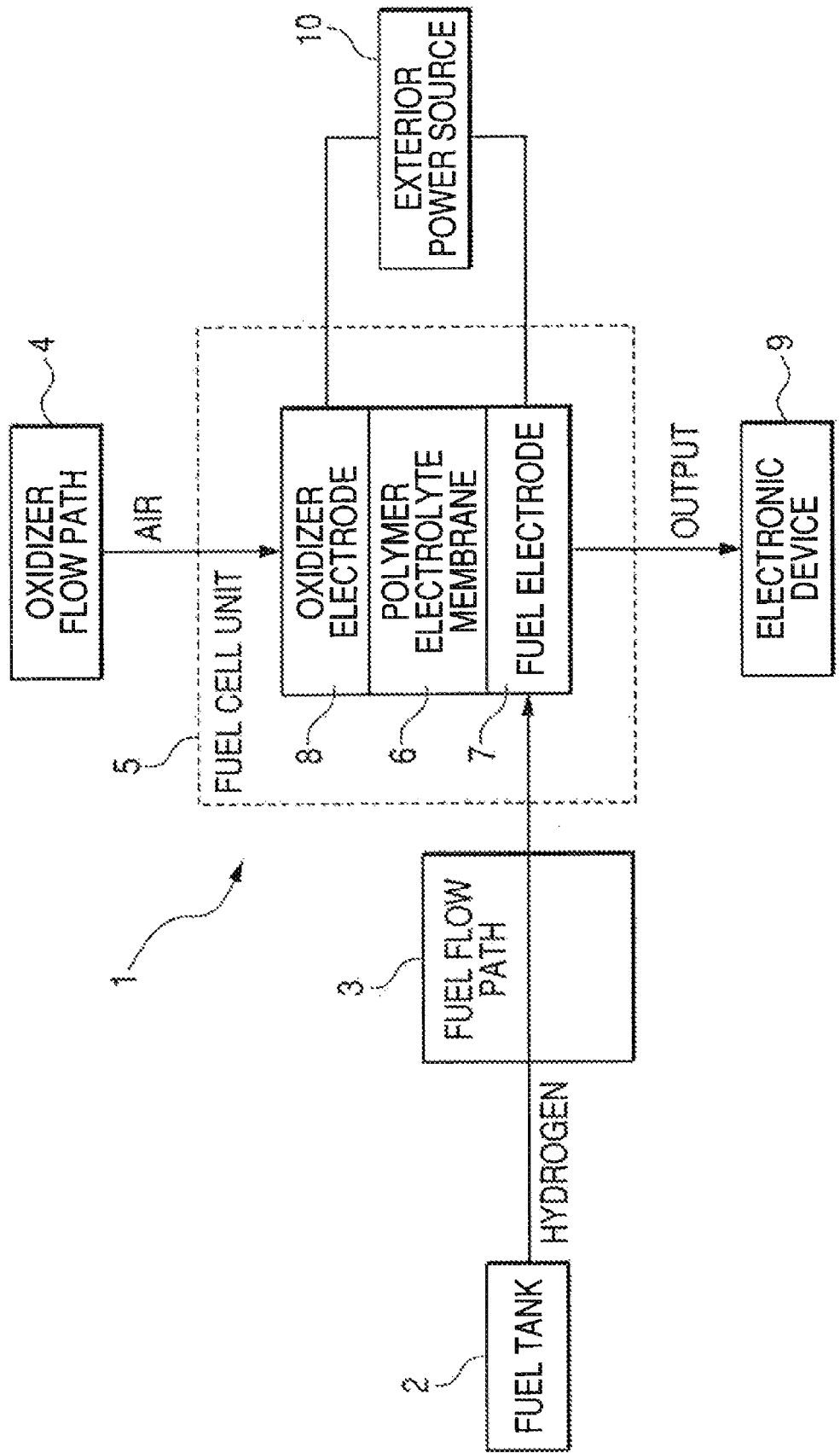
FIG. 1 is a schematic diagram illustrating a structure of a fuel cell system according to an embodiment of the present invention.

Conventionally, for activating a fuel cell, more sufficient moisturization of a polymer electrolyte membrane and retention of a lower potential of an oxidizer electrode than a potential of a fuel electrode are considered to be effective.

However, as a result of study by the inventor of the present invention on a process of an activation treatment, the following is found. For further activation of the fuel cell, a magnitude of a passing current is important.

That is, it is found that there is a correlation between the magnitude of the current passed in the fuel cell at the time of activation treatment and a level of enhancement of the fuel cell characteristics after the activation treatment.

A cause of the correlation is considered to be some effect of protons, which have passed through the polymer electrolyte membrane at the time of activation treatment, on a proton channel of the polymer electrolyte membrane.

The inventor of the present invention have found that, in order to enhance characteristics of the fuel cell in an entire current region used at a time of steady operation, for example, a voltage value at a time of driving at a constant current, it is effective to pass a current equal to or larger than a maximum current passing at a time of the steady operation.

Accordingly, the term "activation" of the present invention refers to increasing a moisture content of the conventional polymer electrolyte membrane, to reducing loss (polarization) by eliminating an oxide layer formed on the catalyst surface, and also to enhancing the characteristics regarding proton conductivity.

Note that the term "steady operation" according to the present invention refers to an operation in which power generation is continuously performed within a fluctuation range of operation conditions represented by impedance of a load from viewpoints of the fuel cell and a supply amount of an oxidizer.

In general, at the time of use of the fuel cell, the fuel cell is used singly or in combination with another fuel cell, with various loads being connected thereto. Further, conditions of the load may change variously depending on operation conditions. Therefore, the impedance of the load in viewpoints of the fuel cell is not constant and may vary largely. Accordingly, a value of a current taken out at a time of the steady operation may vary largely depending on conditions. It is desirable that electric power be taken out more effectively at a current value at that time.

In a fuel cell system according to the present invention, it is desirable that the fuel cell system include a voltage application circuit for applying a voltage of a reverse polarity sufficient for causing a hydrogen production reaction in the oxidizer electrode while maintaining a state of supplying a fuel to the fuel electrode, and for passing a current larger than a maximum current generated at a time of steady operation.

Further, the fuel cell manufactured by a manufacturing method including the activation treatment step has enhanced characteristics in the entire current region used, thereby being desirable.

Embodiment 1

Hereinafter, embodiments of the present invention are described with reference to the drawings.

FIG. 1 is a schematic diagram illustrating a fuel cell system operated by an activation method for a fuel cell according to Embodiment 1 of the present invention.

A fuel cell system 1 includes a fuel cell unit 5 having a membrane electrode assembly of a structure in which a fuel electrode 7 and an oxidizer electrode 8 are provided on both sides of a polymer electrolyte membrane 6, or a fuel cell stack having a structure in which a plurality of fuel cell units are stacked on each other. The fuel cell system 1 further includes a fuel flow path 3 for supplying a fuel to the fuel electrode 7 and an oxidizer flow path 4 for supplying an oxidizer to the oxidizer electrode 8. The fuel cell system 1 further includes an exterior power source 10, which is the voltage application circuit of the present invention, connected to the fuel electrode 7 and the oxidizer electrode 8.

While there can be used, as a fuel for the fuel cell unit 5 according to Embodiment 1 of the present invention, various fuels such as pure hydrogen and methanol, hydrogen occurring small polarization in the fuel electrode can be desirably used as the fuel.

A hydrogen fuel is supplied from, for example, a fuel tank 2 to the fuel electrode 7 through the fuel flow path. As the fuel tank 7, any member may be used as long as the hydrogen fuel can be supplied to the fuel cell, and a member which retains hydrogen charged at high pressure or hydrogen stored in a hydrogen storage material can be suitably used. Further, there may be employed a system in which a liquid fuel such as methanol or ethanol is retained in the fuel tank 2 and the liquid fuel is allowed to pass through a reformer to have a form of a hydrogen gas and is supplied to the fuel cell.

For example, air is supplied to the oxidizer electrode 8 by natural diffusion. Further, air may be supplied thereto by using an auxiliary device such as a fan. Further, an oxygen gas charged and contained in a separate tank may be supplied thereto.

As the polymer electrolyte membrane 6, a perfluorosulfonate proton exchange resin membrane can be used. It is required that a polymer electrolyte membrane be quickly humidified at a start of an operation, so the polymer electrolyte membrane can be a film as thin as possible. When a consideration is given to a mechanical strength, gas barrier property, or the like of the polymer electrolyte membrane, the polymer electrolyte membrane can have a thickness of about 50 μm.

The membrane electrode assembly of the polymer electrolyte fuel cell is manufactured as described below, for example.

First, catalyst-carrying particles such as platinum black or platinum-carrying carbon, a polymer electrolyte solution, and an organic solvent such as isopropyl alcohol are mixed, thereby preparing a catalyst ink. Next, the catalyst ink is deposited, for example, by spray coating, screen printing, or doctor blading, or the like on a polymer film made of polytetrafluoroethylene (PTFE) or the like, a carbon electrode substrate made of a conductive porous material, or the like, thereby forming a catalyst layer.

Next, the obtained catalyst layers are compression-bonded to the polymer electrolyte membrane by thermal transfer or the like with the catalyst-carrying sides thereof being brought into contact with both surfaces of the polymer electrolyte membrane, thereby obtaining the membrane electrode assembly.

Further, as a catalyst material, there may be used, besides platinum, a precious metal catalyst or an alloy catalyst.

Further, for formation of the catalyst layer, there may be used a deposition process such as plating or sputtering.

The fuel flow path 3 and the fuel electrode 7 have structures in which, in order to prevent a fuel supplied from the fuel tank 2 from leaking to an outside of the fuel cell system, seal members are arranged on a connection portion between components and an outer periphery of the fuel electrode.

The fuel cell unit 5 is connected to the exterior power source 10 separately from an electronic device 9 which is an exterior load to which an output by the power generation is supplied.

The exterior power source 10 controls a load such that, at the time of activation treatment of the fuel cell, a hydrogen production reaction is performed in the oxidizer electrode of the fuel cell. Specifically, the control is performed such that a potential of the oxidizer electrode is negative with respect to a potential of the fuel electrode.

The exterior power source 10 may be a power source such as a secondary battery or a capacitor, and may control the load by connecting a positive electrode of the power source to the fuel electrode and connecting a negative electrode of an auxiliary power source to the oxidizer electrode.

Herein, the control performed by the exterior power source 10 is described in detail.

Figure 2:
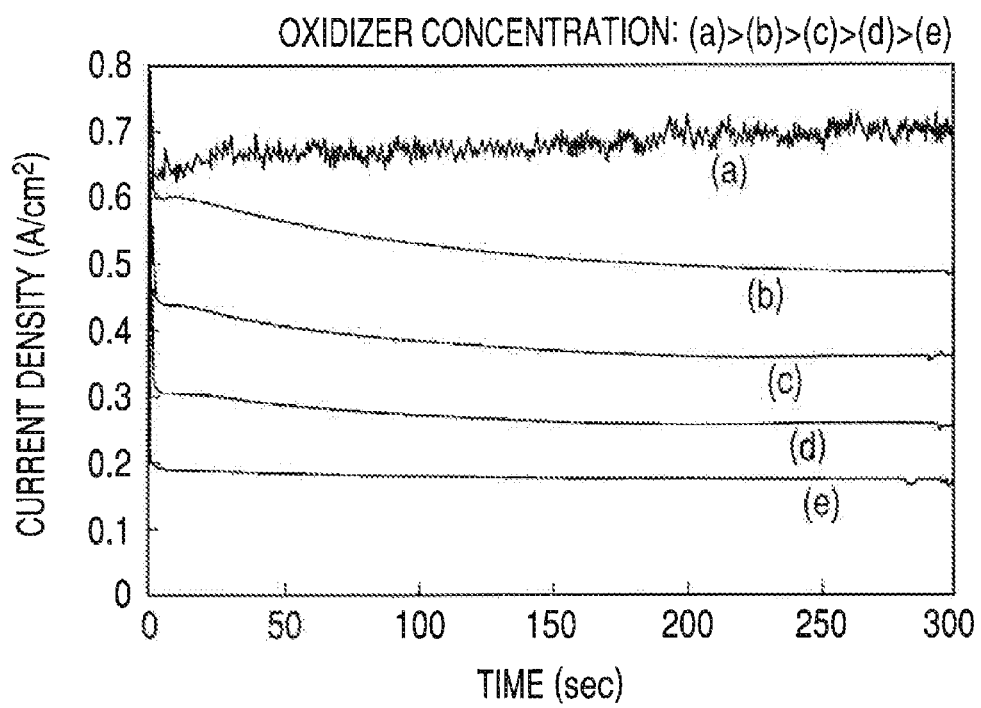
FIG. 2 is a graph for illustrating diffusion limiting currents with respect to an oxidizer concentration in a fuel cell according to the embodiment of the present invention.
Figure 3:
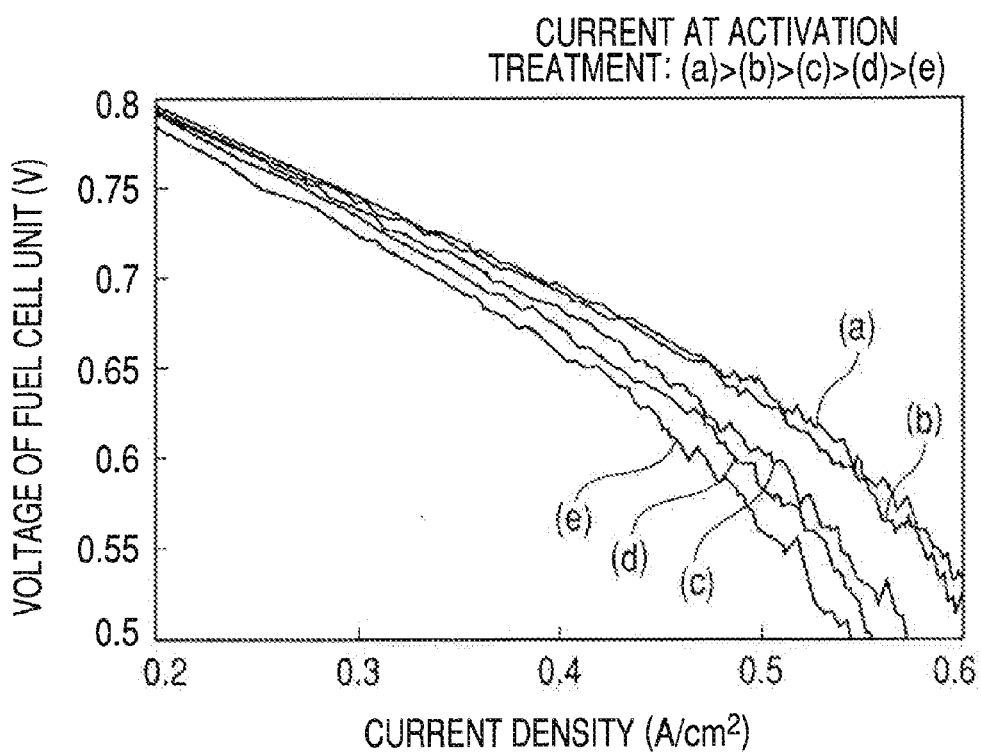
FIG. 3 is a graph for illustrating characteristics of the fuel cell with resect to a passing current according to the embodiment of the present invention.

FIGS. 2 and 3 are graphs each illustrating how a magnitude of a current allowed to flow at the time of activation treatment affects characteristics of the fuel cell.

In FIG. 2, regarding the fuel cells different from each other in oxygen concentration of the oxidizer to be supplied, there are illustrated, for each oxygen concentration, a change of a magnitude of a current over time allowed to flow when a potential difference between the opposite electrodes of the fuel cell unit is controlled to 0 V. One denoted by a symbol (a), in which a largest current flows, indicates data in a case where air is supplied under the same conditions as those in a steady operation. Data are denoted by symbols (b) to (e), which are obtained in cases with the oxygen concentrations of the oxidizer gradually decreasing in the stated order. The smaller the concentration of oxygen becomes than that of air, the lower a limiting current of the fuel cell becomes. Accordingly, it is understood that the limiting current is restrained by shortage of the oxidizer.

FIG. 3 illustrates current-voltage characteristics of the fuel cell unit when air is supplied to the oxidizer electrode after performing the same treatments as those in the cases of the data (a) to (e) of FIG. 2. It is understood that the fuel cell unit, in which a larger current flows at the time of activation treatment, have more favorable characteristics. Further, when the fuel cell unit of the data (a) in which the largest current flows at the time of activation treatment is used as a reference, it is understood that a current value at which a difference is caused in the characteristics is almost the same as the magnitude of the current flown at the time of activation treatment.

In terms of this understanding, it is found that, in order to obtain an effect of the activation treatment of the fuel cell in an entire current region at a time of the steady operation of the fuel cell, it is required to flow a current of a value equal to or more than the maximum current value at a time of the steady operation of the fuel cell.

Figure 4:
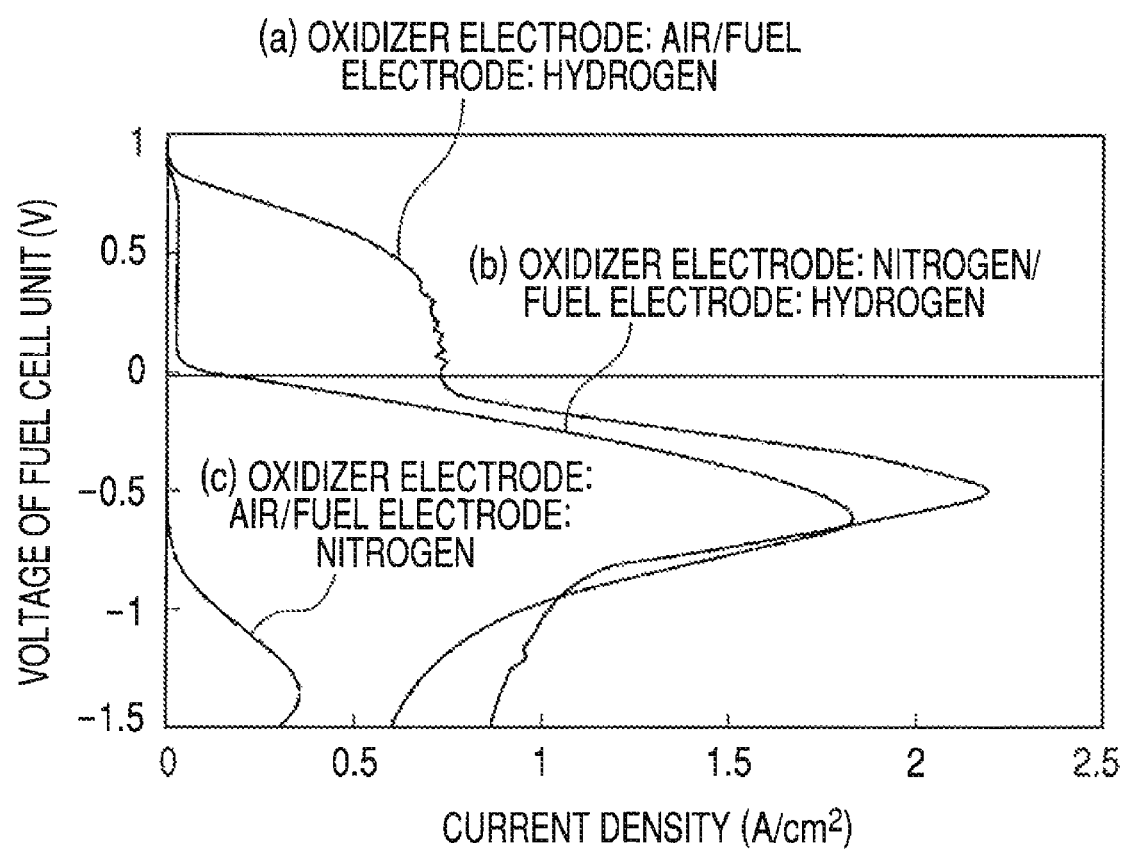
FIG. 4 is a graph for illustrating behaviors at a time of polarity inversion of the fuel cell according to the embodiment of the present invention.

Further, FIG. 4 is a graph illustrating changes in current value in a case where the voltage of the fuel cell is reduced from an open circuit voltage to a negative side at a sweep rate of 50 mV/sec. In FIG. 4, the data (a) illustrates the characteristics in a case where hydrogen is supplied to the fuel electrode of the fuel cell and air is supplied to the oxidizer electrode thereof. During a period in which the voltage changes from the open circuit voltage to 0 V, a reaction of the following (formula 1) occurs in the fuel electrode, and a reaction of the following (formula 2) occurs in the oxidizer electrode. Those are so-called fuel cell reactions.

$$\text{fuel electrode: } H_2 \rightarrow 2H^+ + 2e^- \qquad \text{(formula 1)}$$

$$\text{oxidizer electrode: } \tfrac{1}{2}O_2 + 2H^+ + 2e^- \rightarrow H_2O \qquad \text{(formula 2)}$$

Further, when a cell voltage is 0 V, the limiting current is restrained due to shortage of the oxidizer.

As the voltage of the fuel cell is further reduced from 0 V to the negative side, levels of a potential of the oxidizer electrode and a potential of the fuel electrode are inverted. In this case, in the fuel electrode, the reaction expressed by the above-mentioned (formula 1) is performed, and in the oxidizer electrode, a reaction of the following (formula 3) is newly started.

$$\text{oxidizer electrode: } 2H^+ + 2e^- \rightarrow H_2 \qquad \text{(formula 3)}$$

In a hydrogen production reaction expressed by the (formula 3), there is allowed to flow a current which corresponds to an amount of protons moving from the fuel electrode through the polymer electrolyte membrane. Accordingly, in the fuel cell in which a diffusion limiting current is reached due to shortage of the oxidizer, when the polymer electrolyte membrane contains sufficient moisture, owing to the hydrogen production reaction, a current larger than the limiting current of the fuel cell can be allowed to flow therethrough.

In this case, the oxidizer exists in the oxidizer electrode of the fuel cell of the data (a). Accordingly, it is conceived that, in the oxidizer electrode after the inversion of the potentials, the reactions expressed by the (formula 2) and the (formula 3) simultaneously occur.

In FIG. 4, the data (b) is a graph illustrating characteristics in a case where hydrogen is supplied to the fuel electrode and nitrogen of high concentration is supplied to the oxidizer electrode. Supply of the oxidizer is substantially zero, so with a voltage from the open circuit voltage to 0 V, the reaction of the (formula 2) is barely occurred in the oxidizer electrode. Accordingly, compared to the data (a) in which air is supplied, the limiting current is extremely small. However, when the voltage reaches about 0.1 V, the reaction of the (formula 3) starts to occur. After the inversion of the potentials, a current can be allowed to flow, which is larger than the limiting current in the fuel cell reaction of the data (a) in which air is supplied.

That is, even in the fuel cell in which limiting current is restrained due to shortage of the oxidizer, when the polymer electrolyte membrane sufficiently contains moisture, by the hydrogen production reaction, a current larger than the limiting current of the fuel cell can be allowed to flow therethrough.

In this case, in both the data (a) in which the oxidizer is supplied and the data (b) in which the oxidizer is not supplied, the potential of the oxidizer electrode with respect to the potential of the fuel electrode of the fuel cell indicates a peak of the current around −0.5 V to −0.7 V. This is probably because, in the fuel electrode, a potential at which electrolysis of water occurs is nearly reached, or a moving amount of protons is large, so entrained water in the polymer electrolyte membrane becomes insufficient.

Accordingly, it is found that a range of a current which can be allowed to flow in the hydrogen production reaction is a range equal to or lower than the maximum value of the peak of the current allowed to flow by the production of hydrogen.

Further, the data (c) of FIG. 4 illustrates characteristics in a case where nitrogen is supplied to the fuel electrode and air is supplied to the oxidizer electrode. Because there is no supply of hydrogen, that is, protons, the fuel cell reaction and the hydrogen production reaction are barely occurred and there is no flow of a current. However, when the potential of the oxidizer electrode of the fuel cell with respect to the potential of the fuel electrode is changed to the negative side with respect to about −0.7 V, a reaction of electrolysis of water expressed by the following (formula 4) occurs in the fuel electrode, thereby allowing a current to flow therethrough.

$$\text{fuel electrode: } H_2O \rightarrow \tfrac{1}{2}O_2 + 2H^+ + 2e^- \qquad \text{(formula 4)}$$

The reaction of (formula 4) in fuel electrode is also occurred in the cases shown by the pieces of data (a) and (b). When, in a state of supplying a fuel to the fuel electrode, oxygen produced by the electrolysis reaction of water is produced in the fuel electrode, catalytic combustion occurs, thereby inducing deterioration of components of the fuel cell. Accordingly, the potential difference between the oxidizer electrode and the fuel electrode at the time of activation treatment has to be controlled within a range before the electrolysis reaction of water occurs in the fuel electrode.

Figure 5:
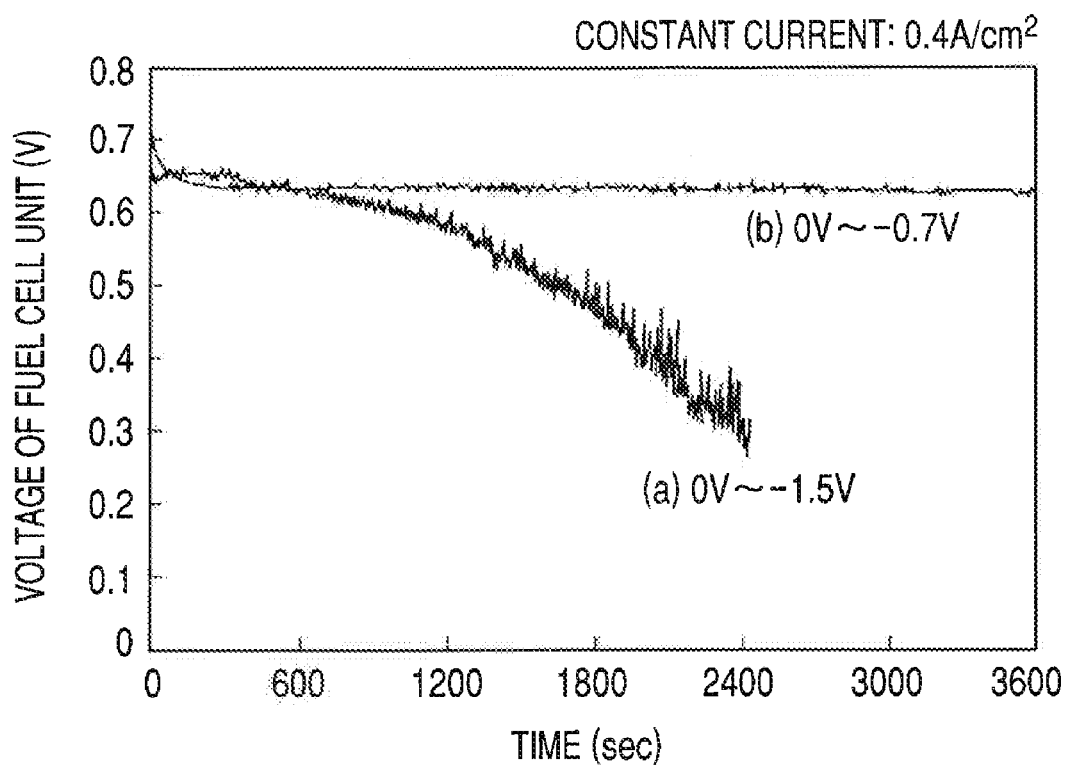
FIG. 5 is a graph for illustrating characteristics after a polarity inversion test of the fuel cell according to the embodiment of the present invention.

FIG. 5 is a graph illustrating changes in characteristics over time when a constant current is applied to the fuel cell, for presence or absence of a history of occurring the catalytic combustion. The data (a) of FIG. 5 is a graph illustrating characteristics of the fuel cell in which by repetitive application of a voltage from 0 V to −1.5 V, the electrolysis of water occurs in the fuel electrode, thereby occurring the catalytic combustion. On the other hand, the data (b) of FIG. 5 is a graph illustrating characteristics of the fuel cell in which a voltage of 0 V to −0.7 V is repetitively applied such that the electrolysis of water is not occurred in the fuel electrode.

In the case of the data (a) in which the electrolysis of water occurs, the characteristics are largely declined. This may be resulted from deterioration due to the catalytic combustion by hydrogen and oxygen produced in a hydrogen atmosphere. On the other hand, in the case of the data (b) in which there is repetitively applied a voltage, at a level of not occurring the electrolysis of water in the fuel electrode, the hydrogen is probably produced in the oxidizer electrode to occur the catalytic combustion with oxygen in the air. However, as indicated by the characteristics of the data (b), it is understood that an effect thereof is small.

Accordingly, it is found that a favorable range of a voltage obtained through control for the hydrogen production reaction corresponds to a range before the electrolysis reaction of water occurs in the fuel electrode.

The control by the exterior power source 10 may be a constant voltage control in which the voltage of the fuel cell unit is retained constant, or may be a constant current control in which the current of the fuel cell unit is retained constant. Further, the control may be performed such that the cell unit voltage is gradually reduced to the negative side or that the cell unit current is gradually made larger to be larger than the limiting current, thereby inverting levels of the potentials of the fuel electrode and the oxidizer electrode.

A range of the voltage applied to the fuel cell unit by the control of the exterior power source 10 is a range of the potential difference from 0 V to occurrence of the electrolysis reaction of water occurred in the fuel electrode, that is, the cell unit voltage of 0 V to −1.23 V. According to results of the test of FIG. 4, the electrolysis of water occurs in the fuel electrode at the voltage of about −0.7 V, so the range is desirably a range of the cell unit voltage of 0 V to −0.7 V. Further, according to results of the polarity inversion test of FIG. 4, the peak of the current allowed to flow by the production of hydrogen is about −0.5 V, so the range is more desirably a range of the cell unit voltage of 0 V to −0.5 V. Further, a range of a current allowed to flow through the fuel cell unit by the control of the exterior power source 10 is a range of the limiting current according to the (formula 2) or more, which is exhibited by the fuel cell due to shortage of the oxidizer and the maximum value of the peak according to the (formula 3) or less, which is exhibited by the current allowed to flow by the production of hydrogen.

Further, the above-mentioned conditions of both the voltage and the current have to be satisfied.

Further, in a case where the exterior power source 10 is an auxiliary power source such as a secondary battery and a voltage of the auxiliary power source exceeds the above-mentioned range, the control is enabled by using a voltage regulation unit such as a DC/DC converter, for example.

The current allowed to flow by the hydrogen production exhibits a peak probably because the moving amount of protons is large, so entrained water in the polymer electrolyte membrane becomes insufficient.

Accordingly, the exterior power source can be controlled more desirably by using a reduction amount of the current allowed to flow by the hydrogen production from an initial amount thereof as a threshold value.

Further, in order to allow the current equal to or larger than the limiting current to pass through the fuel cell unit by the hydrogen production reaction, the polymer electrolyte membrane has to sufficiently contain moisture.

Figure 6:
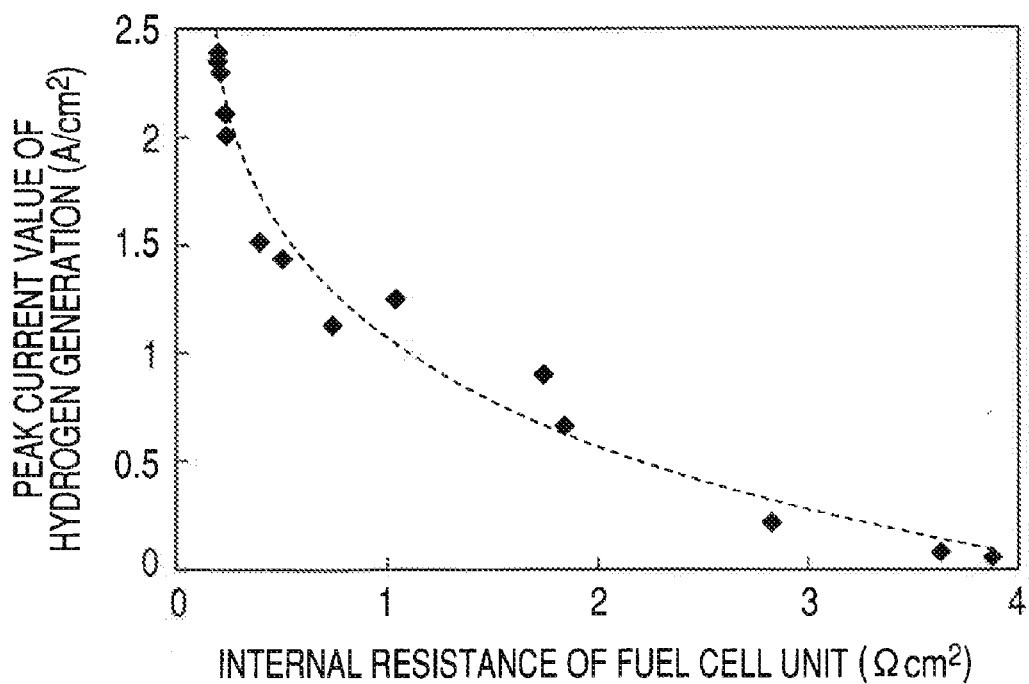
FIG. 6 is a graph for illustrating a relationship between an internal resistance of the fuel cell and a current which flows owing to production of hydrogen according to the embodiment of the present invention.

FIG. 6 illustrates a relation between an internal resistance of the fuel cell unit and a peak value of a current allowed to flow by the production of hydrogen. The higher the moisture content of the polymer electrolyte membrane is, the smaller the internal resistance is exhibited. Further, according to FIG. 6, the smaller the internal resistance is, the larger the maximum value of the peak of the current allowed to flow by the production of hydrogen is. This shows that the hydrogen production reaction is regulated mainly by the moving amount of protons. Further, it is found that, in order to allow the current larger than the limiting current exhibited by the fuel cell to flow by the hydrogen production reaction with respect to a supply amount of the oxidizer at a time of the steady operation, the polymer electrolyte membrane has to contain moisture to a certain degree. For moisturizing the polymer electrolyte membrane, there may be used, for example, a humidification unit functioning so as to supply a fuel gas which is humidified by being passed through a bubbler or the like.

Further, it is more desirable that, before the activation treatment, a sufficient amount of water be produced in the oxidizer electrode by the fuel cell reaction and the polymer electrolyte membrane be sufficiently humidified, and that the activation treatment be then performed. In this case, even when the entrained water in the polymer electrolyte membrane is reduced by the hydrogen production reaction, a product water on the oxidizer electrode side is inversely diffused and also humidifies the polymer electrolyte membrane.

Further, when, in the state of supplying the oxidizer to the oxidizer electrode, the activation treatment is performed, in the oxidizer electrode, the water production reaction expressed by the (formula 2) and the hydrogen production reaction expressed by the (formula 3) are simultaneously occurred. In this case, due to the inverse diffusion of the product water produced in the oxidizer electrode, the polymer electrolyte membrane can be humidified.

Further, reduction of the supply amount of the oxidizer at the time of activation treatment is desirable because unnecessary generation of heat owing to the catalytic combustion by hydrogen produced in the oxidizer electrode and oxygen can be reduced.

Figure 7:
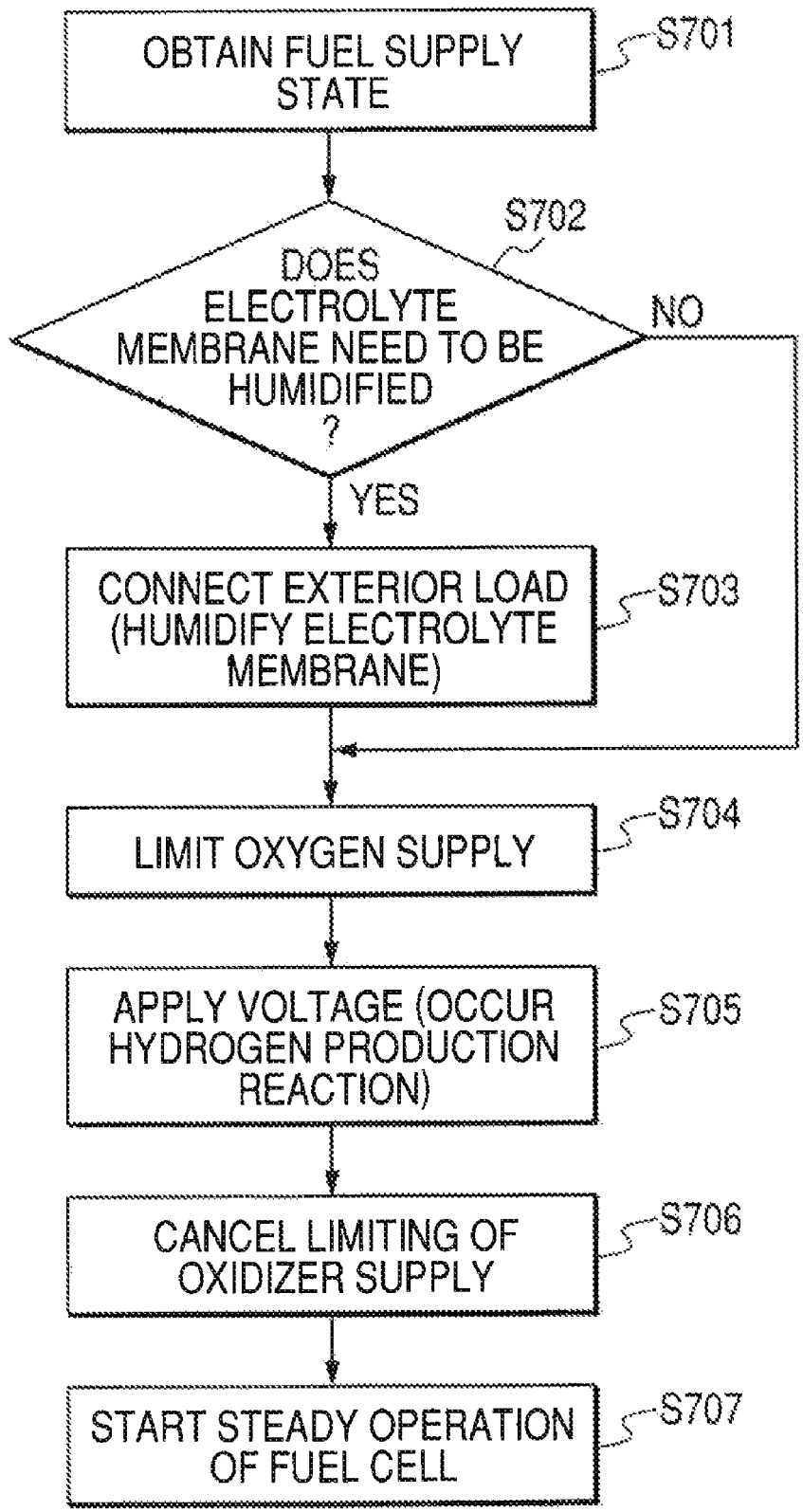
FIG. 7 is a flow chart for illustrating a routine of activation of the fuel cell according to the embodiment of the present invention.

Further, FIG. 7 illustrates a routine of the activation treatment of the fuel cell according to this embodiment.

(S701)

At initiation of the activation treatment, there is obtained a state in which a fuel is sufficiently supplied to the fuel cell unit.

(S702)

Next, it is determined whether or not the polymer electrolyte membrane of the fuel cell unit needs to be humidified.

As illustrated in FIG. 6, in an activation method according to the present invention, it is desirable that the polymer electrolyte membrane be sufficiently humidified. Here, by measuring an internal resistance of the fuel cell by an AC impedance meter, for example, a moisture containment state of the polymer electrolyte membrane may be determined.

(S703)

when it is determined that the internal resistance is high and humidification is necessary, by connection or the like to an exterior load, power generation is performed in the fuel cell to achieve self humidification. The humidification may be finished when the internal resistance is reduced. As a matter of course, when the internal resistance is sufficiently small at the beginning, the humidification is not necessary. Further, there may be employed a structure in which the determination of humidification is not performed, a certain load is always connected thereto, and water produced by performing a certain power generation is used to humidify the polymer electrolyte membrane. In this case, regardless of the moisture containment state of the polymer electrolyte membrane, a certain amount of fuel and time for humidification are required. However, there is no need of a mechanism for measuring the internal resistance, so this structure can be used for a fuel cell of which downsizing is particularly required. Further, a humidification method may be such a method that supplies a gas humidified by being passed through a bubbler or the like, or a method of directly humidifying the polymer electrolyte membrane by providing a separate water supply unit.

(S704)

As occasion needs, supply of the oxidizer is limited.

In the activation method of the present invention, there is no need of positively supplying the oxidizer. In a case where there is a demand for reducing a heat generation amount of the fuel cell unit, a supply amount of oxidizer can be reduced. Further, when the activation is performed in a state of supplying the oxidizer, in the oxidizer electrode, the water production reaction and the hydrogen production reaction are simultaneously occurred. Accordingly, there is also an effect of enabling the produced water to be used for humidification.

(S705)

The cell unit voltage of the fuel cell is controlled such that the hydrogen production reaction occurs in the oxidizer electrode.

For the voltage control at the time of activation treatment, the exterior power source is used. The exterior power source to be used may be an auxiliary power source including a secondary battery or a capacitor and the voltage regulation unit including the DC/DC converter, for example. The positive electrode of the exterior power source is connected to the fuel electrode and the negative electrode thereof is connected to the oxidizer electrode, thereby performing the activation treatment.

(S706)

When the supply amount of oxidizer is reduced at the time of activation treatment, control is performed such that the oxidizer is supplied in an amount corresponding to that at a time of the steady operation.

(S707)

After the end of the activation, the controlling of the fuel cell by the exterior power source is terminated.

The fuel cell is then allowed to start the steady operation.

Embodiment 2

Figure 11:
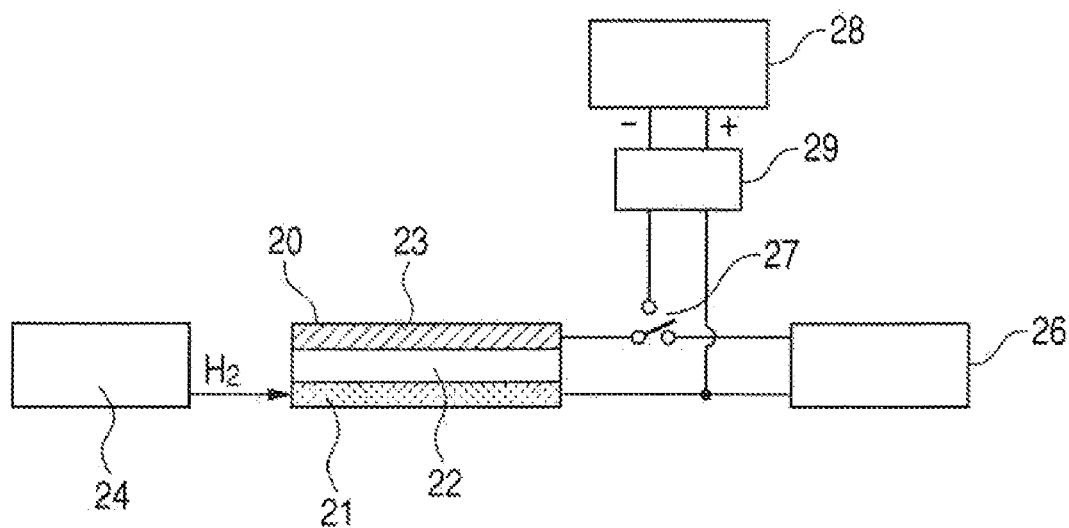
FIG. 11 is a schematic diagram illustrating a structure of a fuel cell system according to Example 2 of the present invention.

In Embodiment 2, a description is made of an example of an activation treatment for a fuel cell unit of an atmosphere open type according to another embodiment of the present invention, in which hydrogen is supplied as a fuel and air is taken in as an oxidizer through natural diffusion. FIG. 11 is a schematic diagram illustrating a structure of a fuel cell system of this embodiment. Further, the structure of the fuel cell unit of this embodiment is the same as that of Embodiment 1.

In FIG. 11, there are illustrated a fuel cell unit 20, a fuel electrode 21, a polymer electrolyte membrane 22, an oxidizer electrode 23, a fuel tank 24, an exterior load 26, a switch 27, an Li-ion battery 28 and a DC/DC converter 29.

The fuel cell unit 20 and the Li-ion battery 28 are connected to each other through the DC/DC converter 29. The Li-ion battery 28 is structured so as to connect, at the time of activation treatment of the fuel cell, the positive electrode to the fuel electrode and the negative electrode to the oxidizer electrode.

The fuel cell unit 20 is installed in an environmental test apparatus controlled to have a temperature of 25° C. and a humidity of 50%. To the oxidizer electrode 23, air in an environment atmosphere is supplied through natural diffusion. To the fuel electrode 21, dry hydrogen is supplied.

First, the fuel cell unit 20 is driven by being connected to the exterior load 26, thereby humidifying the polymer electrolyte membrane 22 by a feature of inverse diffusion of water produced in the oxidizer electrode 23.

Next, for the activation, the switch 27 is controlled such that the oxidizer electrode 23 of the fuel cell unit 20 is connected to the negative electrode of the Li-ion battery 28, and the fuel electrode 21 of the fuel cell unit 20 is connected to the positive electrode of the Li-ion battery 28. The DC/DC converter 29 is controlled such that a potential of the oxidizer electrode 23 of the fuel cell unit is $-0.5$ V with respect to that of the fuel electrode 21 thereof. As the step-down DC/DC converter with a low output voltage, there is provided AV2102 manufactured by Aivaka US, for example.

In the oxidizer electrode 23, along with the water production reaction, the hydrogen production reaction occurs. Accordingly, by the hydrogen production, a current equal to or larger than the limiting current of the fuel cell reaction flows.

When, after performing the activation for 1 minute, current-voltage characteristics of the fuel cell unit 20 are measured, compared with the fuel cell unit for which the activation is not performed, characteristics of the fuel cell unit can be enhanced in a wide range of current.

Figure 12:
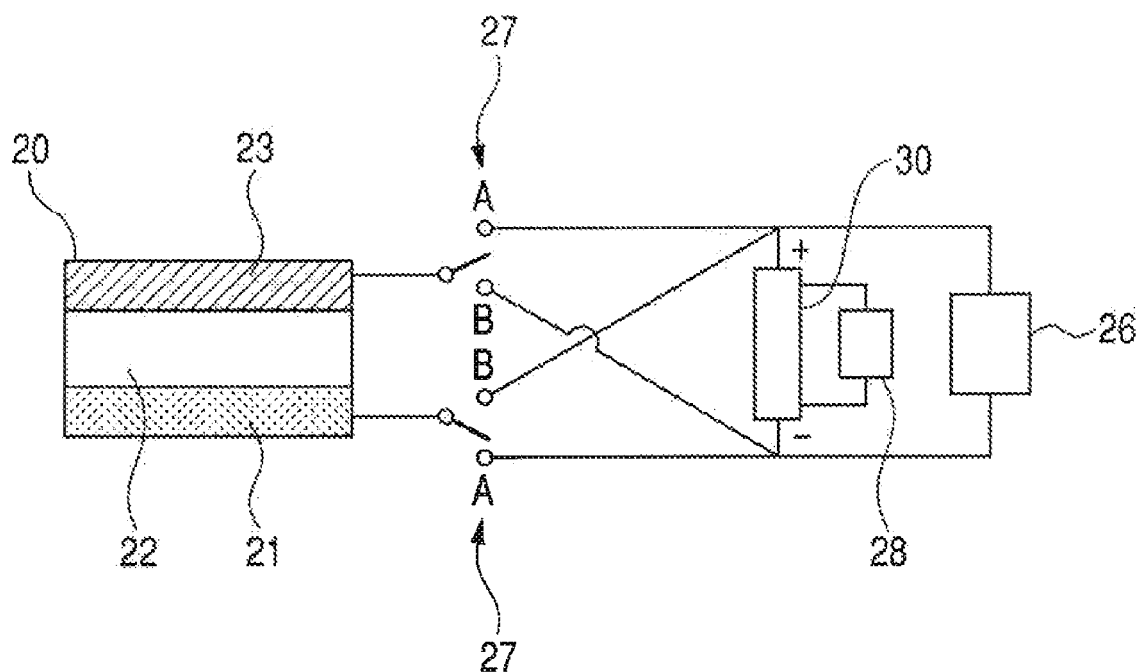
FIG. 12 is a schematic diagram illustrating another structure of the fuel cell system according to Example 2 of the present invention.

Further, in FIG. 11, there is illustrated a structure in which an auxiliary power source including the Li-ion battery 28 and the DC/DC converter 29 is used only for the activation. However, there may be used a hybrid structure as illustrated in FIG. 12. FIG. 12 illustrates the fuel cell unit 20, the fuel electrode 21, the polymer electrolyte membrane 22, the oxidizer electrode 23, the fuel tank 24, the exterior load 26, the switches 27, the Li-ion battery 28, and a voltage regulator 30.

In this case, at the time of normal operation, each of the switches 27 is turned to a side A, thereby allowing the fuel cell unit 20 and the Li-ion battery 28 to supply the outputs to the exterior load 26 in parallel to each other. When a voltage of the Li-ion battery 28 is different from that of the fuel cell unit 20, it suffices that stepping down be performed by the voltage regulator 30 such as the DC/DC converter.

At the time of activation treatment of the fuel cell unit 20, each of the switches 27 is turned to a side B. As a result, the oxidizer electrode 23 of the fuel cell unit 20 is connected to the negative electrode of the Li-ion battery, and the fuel electrode 21 of the fuel cell unit 20 is connected to the positive electrode of the Li-ion battery 28. Further, a magnitude of the voltage applied to the fuel cell unit 20 is regulated by the voltage regulator 30.

At this time, the auxiliary power source including the Li-ion battery 28 and the voltage regulator 30 may be left connected to the exterior load 26 or may be disconnected therefrom. For example, there may be employed a structure in which a switch is inserted between the auxiliary power source and the exterior load 26, and while the switch is normally on, thereby keeping the connection therebetween, the switch is off at the time of activation treatment of the fuel cell, thereby canceling the connection therebetween.

The above-mentioned structure enables the activation of the fuel cell unit.

Embodiment 3

Figure 13:
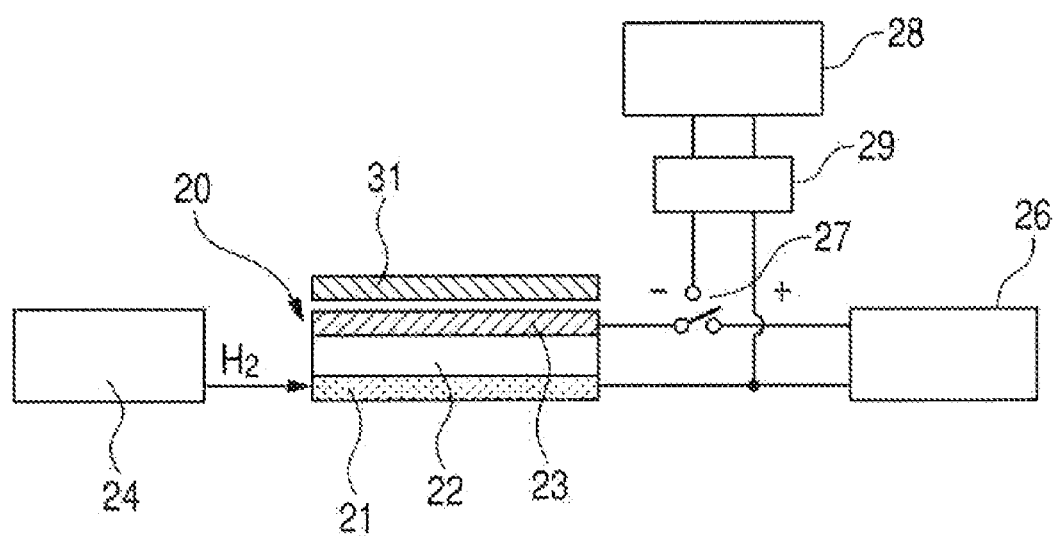
FIG. 13 is a schematic diagram illustrating a structure of a fuel cell system according to Example 3 of the present invention.

In Embodiment 3, a description is made of an example of an activation treatment for a fuel cell unit of an atmosphere open type according to still another embodiment of the present invention, in which hydrogen is supplied as a fuel and air is taken in as an oxidizer. FIG. 13 is a schematic diagram illustrating a structure of a fuel cell system according to this embodiment. Further, a structure of the fuel cell unit according to this embodiment is the same as that of Embodiment 1.

In FIG. 13, there are illustrated the fuel cell unit 20, the fuel electrode 21, the polymer electrolyte membrane 22, the oxidizer electrode 23, the fuel tank 24, the exterior load 26, the switch 27, the Li-ion battery 28, the DC/DC converter 29, an oxidizer amount regulator 31.

The oxidizer amount regulator 31 has a mechanism which makes a supply amount of the oxidizer at the time of activation treatment of the fuel cell unit 20 smaller than that at a time of the steady operation. As the mechanism, there is provided a structure as illustrated in FIG. 14 or 15.

Figure 14:
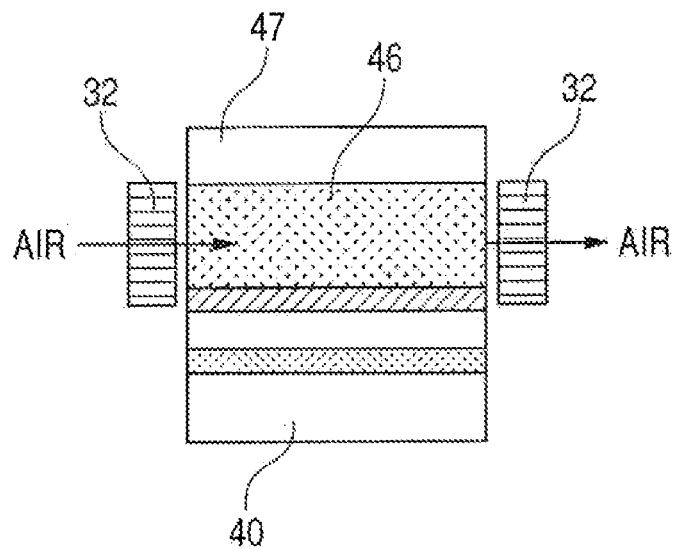
FIG. 14 is a view illustrating a structure of an oxidizer amount regulating unit of the fuel cell system according to Example 3 of the present invention.

In FIG. 14, fans 32 serve as the oxidizer amount regulator 31. The fans 32 are mounted onto side surfaces of a foamed metal 46, constituting air take-in surfaces of the fuel cell unit 20. At a time of the steady operation of the fuel cell unit 20, a larger amount of air is supplied to the oxidizer electrode 23 by driving the fans 32 than in a case with no fan. Further, when the fans 32 are not driven, taking in of air is inhibited by the fans 32, so a take-in amount of air is made smaller than that in the case with no fan. Note that, a current collector (fuel electrode) is denoted by reference numeral 40 and a current collector (oxidizer electrode) is denoted by reference numeral 47.

Figure 15:
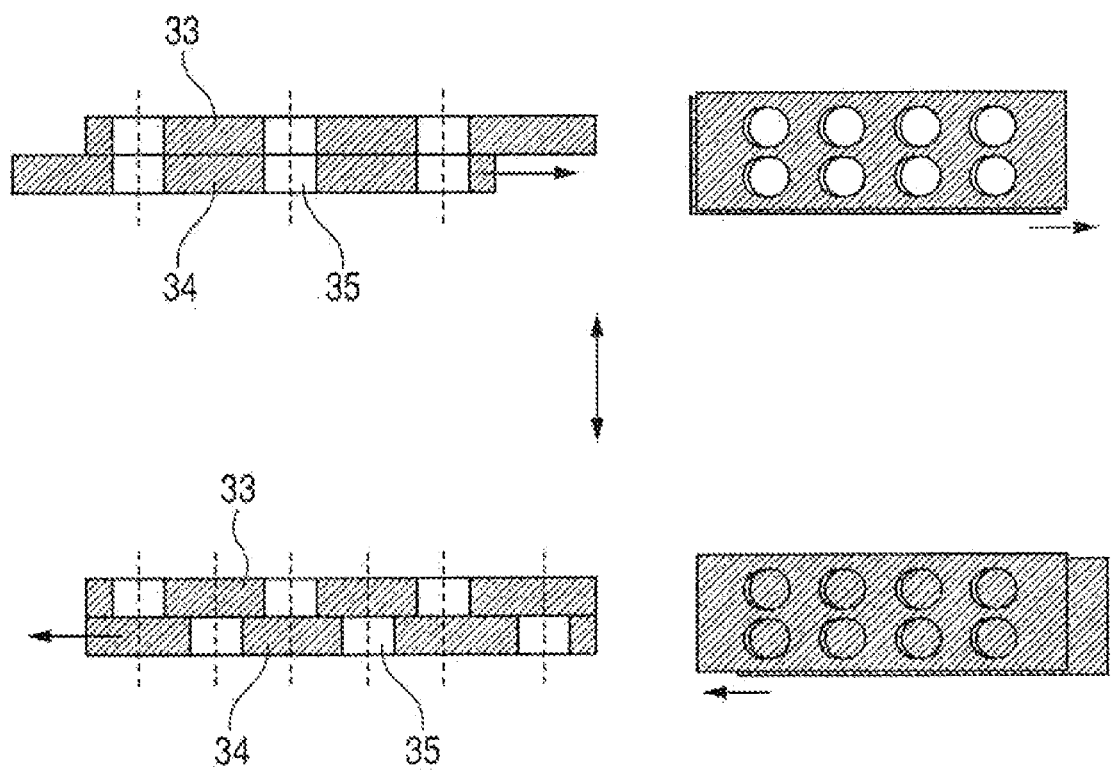
FIG. 15 is a view illustrating another structure of the oxidizer amount regulating unit of the fuel cell system according to Example 3 of the present invention.

Further, of two ventilation plates each having vent holes 35 as illustrated in FIG. 15, one stationary ventilation plate 33 and another movable ventilation plate 34 may be arranged on each side surface of the foamed metal 46. By sliding the movable ventilation plate 34, an opening/closing degree of the vent holes is changed, to thereby change areas of the air take-in surfaces. Owing to a change in area of the air take-in surfaces, a supply amount of the oxidizer is changed.

Similarly to Embodiment 2, the fuel cell unit 20 is connected to the Li-ion battery 28 through the DC/DC converter 29. The Li-ion battery 28 is structured so as to connect, at the time of activation treatment of the fuel cell, the positive electrode to the fuel electrode and the negative electrode to the oxidizer electrode.

The fuel cell unit 20 is installed in an environmental test apparatus controlled to have a temperature of 25° C. and a humidity of 50%. To the oxidizer electrode 23, air in an environment atmosphere is supplied through natural diffusion. To the fuel electrode 21, dry hydrogen is supplied.

First, the fuel cell unit 20 is driven as in the case of Example 1, thereby humidifying the polymer electrolyte membrane 22 by a feature of inverse diffusion of water produced in the oxidizer electrode 23. In this case, when the fans serving as the oxidizer amount regulator 31 are driven to take in a large amount of oxidizer, a current caused by the fuel cell reaction can be larger, so an amount of product water in the oxidizer electrode 23 increases. On the other hand, when regulation is performed such that the take-in amount of the oxidizer is reduced by stopping the driving of the fans serving as the oxidizer amount regulator 31, heat generation in the oxidizer electrode can be suppressed.

After humidifying the fuel cell, for the activation, the switch 27 is controlled such that the oxidizer electrode of the fuel cell unit 20 is connected to the negative electrode of the Li-ion battery 28 and the fuel electrode of the fuel cell unit 20 is connected to the positive electrode of the Li-ion battery 28. The DC/DC converter 29 is controlled such that the potential of the oxidizer electrode 23 is −0.5 V with respect to that of the fuel electrode 21 of the fuel cell unit 20. Further, in this case, the oxidizer amount regulator 31 is driven so as to reduce the supply amount of the oxidizer.

In the fuel cell, levels of the potential of the oxidizer electrode and the potential of the fuel electrode are inverted, so in the oxidizer electrode 23, the water production reaction and the hydrogen production reaction are occurred. In a case where the oxidizer amount regulator 31 is driven and a small take-in amount of air is maintained, in the water production reaction, existing oxygen is consumed, thereby leading to shortage of the oxidizer.

Accordingly, the water production reaction, that is, the limiting current flowing in the fuel cell reaction becomes extremely small. On the other hand, a current flowing in the hydrogen production reaction corresponds to an amount of protons moved from the fuel electrode 21 through the polymer electrolyte membrane 22. Accordingly, regardless of the supply amount of the oxidizer, a large current can be allowed to flow. Therefore, owing to the hydrogen production, a current equal to or larger than the limiting current of the fuel cell reaction flows.

When the above-mentioned activation treatment is performed, compared to the fuel cell unit 20 in which the activation is not performed, characteristics of the fuel cell unit can be enhanced in a wide range of current. Further, an amount of air serving as the oxidizer is reduced, so, compared to the case where a larger amount of air is supplied, a heat generation amount at the time of activation treatment can be suppressed. This embodiment is preferable for a case where there is a demand for suppressing heat generation at the time of activation treatment, for example, for a fuel cell unit in which a heat radiation amount is small compared to a magnitude of the output.

Embodiment 4

Figure 16:
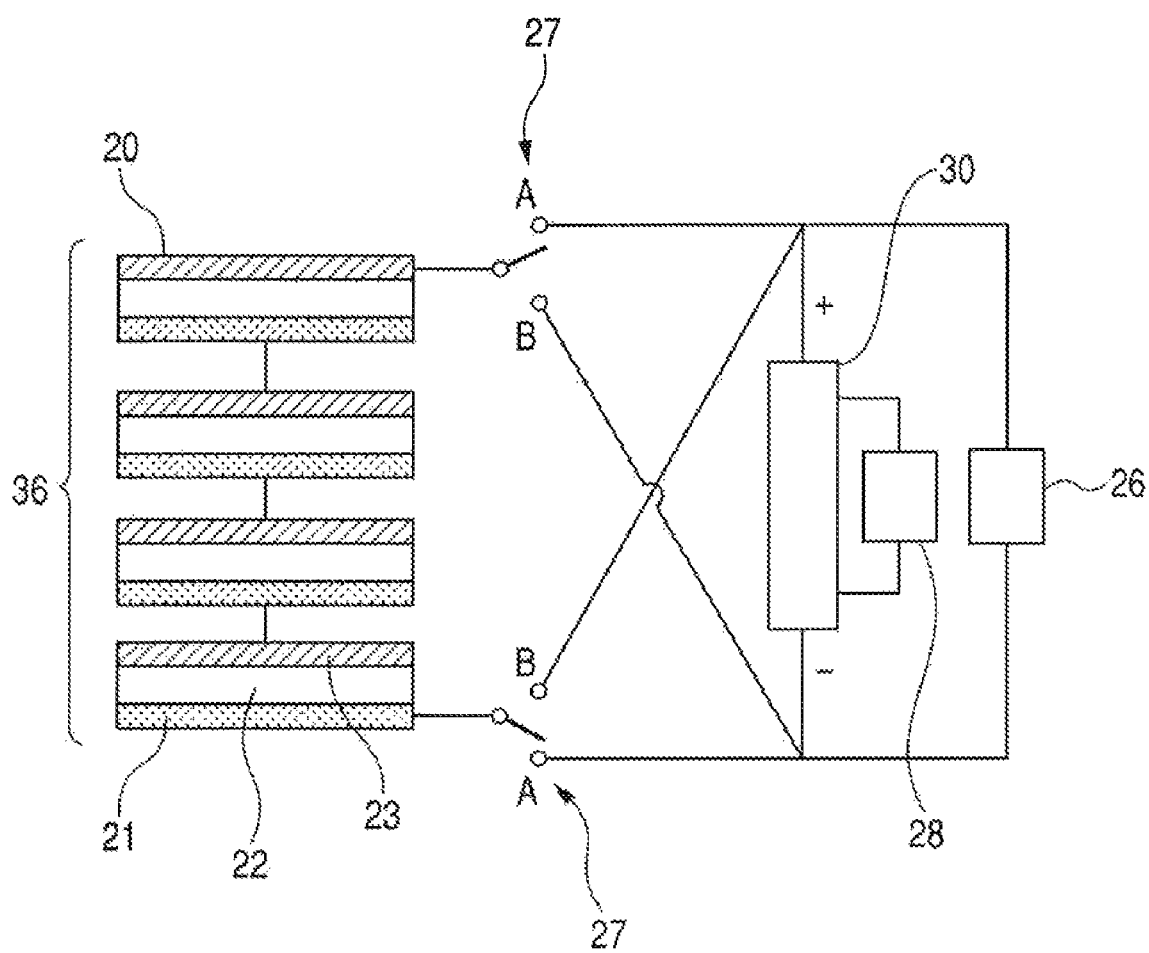
FIG. 16 is a schematic diagram illustrating a structure of a fuel cell system according to Example 4 of the present invention.

In Embodiment 4, a description is made of an example of an activation treatment for a fuel cell stack of an atmosphere open type, in which hydrogen is supplied as a fuel and air is taken in as an oxidizer through natural diffusion. FIG. 16 illustrates a schematic structure of the fuel cell system of this embodiment. Further, a structure of the fuel cell stack of this embodiment is obtained by stacking the four fuel cell units according to Embodiment 1.

In FIG. 16, there are illustrated a fuel cell stack 36, the fuel cell units 20, the fuel electrodes 21, the polymer electrolyte membranes 22, the oxidizer electrodes 23, the exterior load 26, the switches 27, the Li-ion battery 28, the voltage regulator 30.

The fuel cell stack 36 has, similarly to Embodiment 2, the hybrid structure in which the fuel cell stack 36 is connected to the Li-ion battery 28 through the voltage regulator 30.

In this case, at a time of the steady operation, each of the switches 27 is turned to a side A, thereby allowing the fuel cell stack 36 and the Li-ion battery 28 to supply the outputs to the exterior load 26 in parallel to each other. When a voltage of the Li-ion battery 28 is different from that of the fuel cell stack 36, it suffices that stepping up or stepping down be performed by the voltage regulator 30 such as the DC/DC converter.

At the time of activation treatment of the fuel cell stack 36, the switches 27 are turned to a side B, thereby connecting, of output terminals of the fuel cell stack 36, a side of the oxidizer electrode to the negative electrode of the Li-ion battery 28 and a side of the fuel electrode 21 to the positive electrode of the Li-ion battery 28. Further, a magnitude of the voltage applied to the fuel cell stack 36 is regulated by the voltage regulator 30.

In this case, at the time of activation treatment, the voltage regulator 30 is controlled such that the voltage per fuel cell unit of the fuel cell stack is −0.3 V. That is, in the case of the fuel cell stack in which the four fuel cell units are stacked, at the time of activation treatment, a voltage of 1.2 V is applied between both terminals of the fuel cell stack with the levels of the potential of the fuel electrode and the potential of the oxidizer being inverted.

In this case, the auxiliary power source including the Li-ion battery 28 and the voltage regulator 30 may be left connected to the exterior load 26 or may be disconnected therefrom. For example, there may be employed a structure in which a switch is disposed between the auxiliary power source and the exterior load 26, and at the time of activation treatment of the fuel cell, the connection therebetween is canceled. Alternatively, also at the time of activation treatment, the connection therebetween is maintained to supply power from the auxiliary power source to the exterior load.

The fuel cell stack 36 is installed in the environmental test apparatus controlled to have a temperature of 25° C. and a humidity of 50%. To the oxidizer electrode 23, air in an environment atmosphere is supplied through natural diffusion. To the fuel electrode 21, dry hydrogen is supplied.

When the activation treatment is performed after humidifying the fuel cell stack 36, through each of the fuel cell units of the fuel cell stack 36, a current equal to or larger than the limiting current of the fuel cell reaction flows.

Normally, it is estimated that, in the fuel cell stack, due to variation in air take-in amount among the fuel cell units, variation is caused in limiting current, and conditions for the activation are not met. In this embodiment, the activation is performed by flowing a current of a value larger than a largest limiting current value.

Embodiment 5

Figure 17:
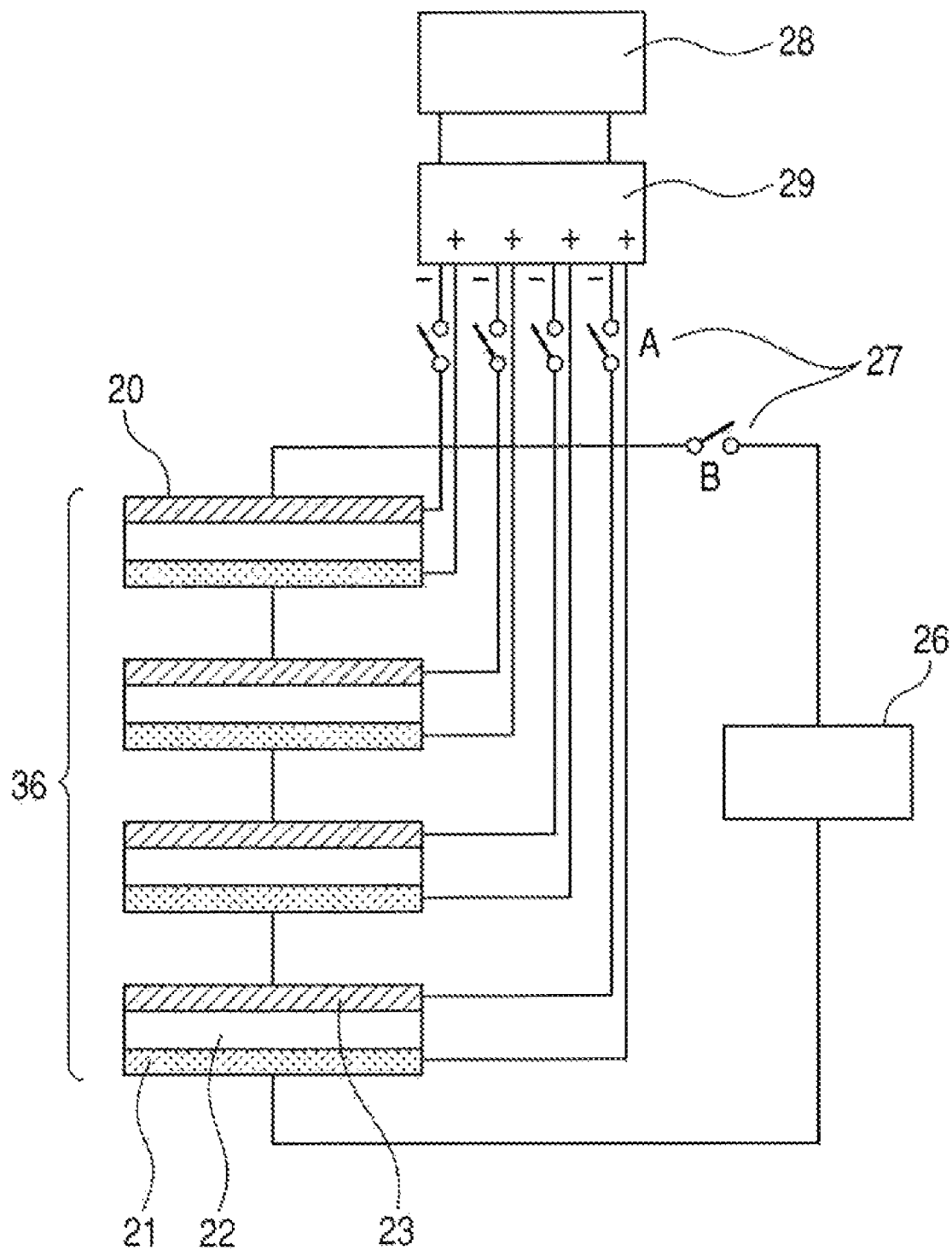
FIG. 17 is a schematic diagram illustrating a structure of a fuel cell system according to Example 5 of the present invention.

In Embodiment 5, a description is made of an example of an activation treatment for a fuel cell stack of an atmosphere open type according to still another embodiment of the present invention, in which hydrogen is supplied as a fuel and air is taken in as an oxidizer through natural diffusion. FIG. 17 illustrates a schematic diagram of a structure of a fuel cell system according to this embodiment. Further, a structure of the fuel cell stack of this embodiment is obtained by stacking the multiple fuel cell units according to Embodiment 1.

In FIG. 17, there are illustrated the fuel cell stack 36, the fuel cell units 20, the fuel electrodes 21, the polymer electrolyte membranes 22, the oxidizer electrodes 23, the exterior load 26, the switches 27, the Li-ion battery 28, and the DC/DC converter 29.

The fuel cell stack 36 is connected, similarly to Embodiment 2, to the Li-ion battery 28 through a voltage regulator such as the DC/DC converter 29. In Embodiment 4, a voltage is applied between both terminals of the fuel cell stack 36. In this case, there is a possibility of causing a voltage difference among the fuel cell units. Regarding this, in this embodiment, the voltage is applied between both electrodes of each of the fuel cell units of the fuel cell stack 36. In this case, at the time of activation treatment, the DC/DC converter 29 is controlled such that the potential of the oxidizer electrode of each of the fuel cell units of the fuel cell stack 36 is −0.5 V with respect to the potential of the fuel electrode.

The fuel cell stack 36 is installed in the environment test apparatus controlled to have, for example, a temperature of 25° C. and a humidity of 50%. To the oxidizer electrode 23, air in an environment atmosphere is supplied through natural diffusion. To the fuel electrode 21, dry hydrogen is supplied.

First, the fuel cell stack 36 is driven by being connected to the exterior load 26, thereby humidifying the polymer electrolyte membrane 22 by a feature of inverse diffusion of water produced in the oxidizer electrode 23. In this case, of the switches 27, the switches denoted by a symbol A are in a disconnected state and the switch denoted by a symbol B is in a connected state.

Next, for the activation, the switches A of the switches 27 are in the connected state and the switches B thereof are in the disconnected state. When the activation treatment is performed, through each of the cell units of the fuel cell stack 36, a current equal to or larger than the limiting current of the fuel cell reaction flows.

Normally, in the fuel cell stack, it is estimated that due to variation in air take-in amount among the fuel cell units, variation is caused in limiting current, and conditions for the activation are not met. In this embodiment, even when there is variation in limiting current among the fuel cell units, a current larger than the limiting current can be allowed to flow through all the fuel cell units. Further, compared to Embodiment 4, reliable activation treatment can be performed, which is not affected by the variation among the fuel cell units.

Hereinafter, a description is made of examples of the present invention.

Example 1

Figure 8:
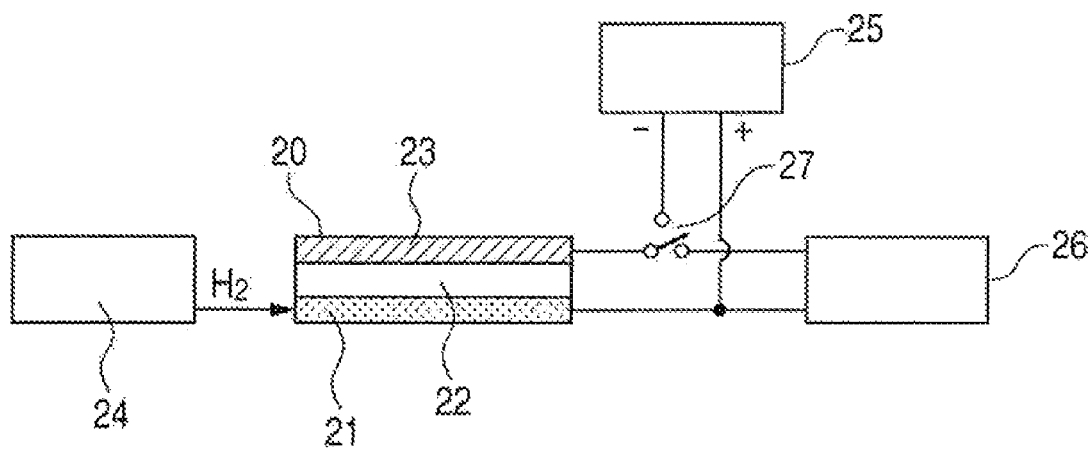
FIG. 8 is a schematic diagram illustrating a structure of a fuel cell system according to Example 1 of the present invention.
Figure 9:
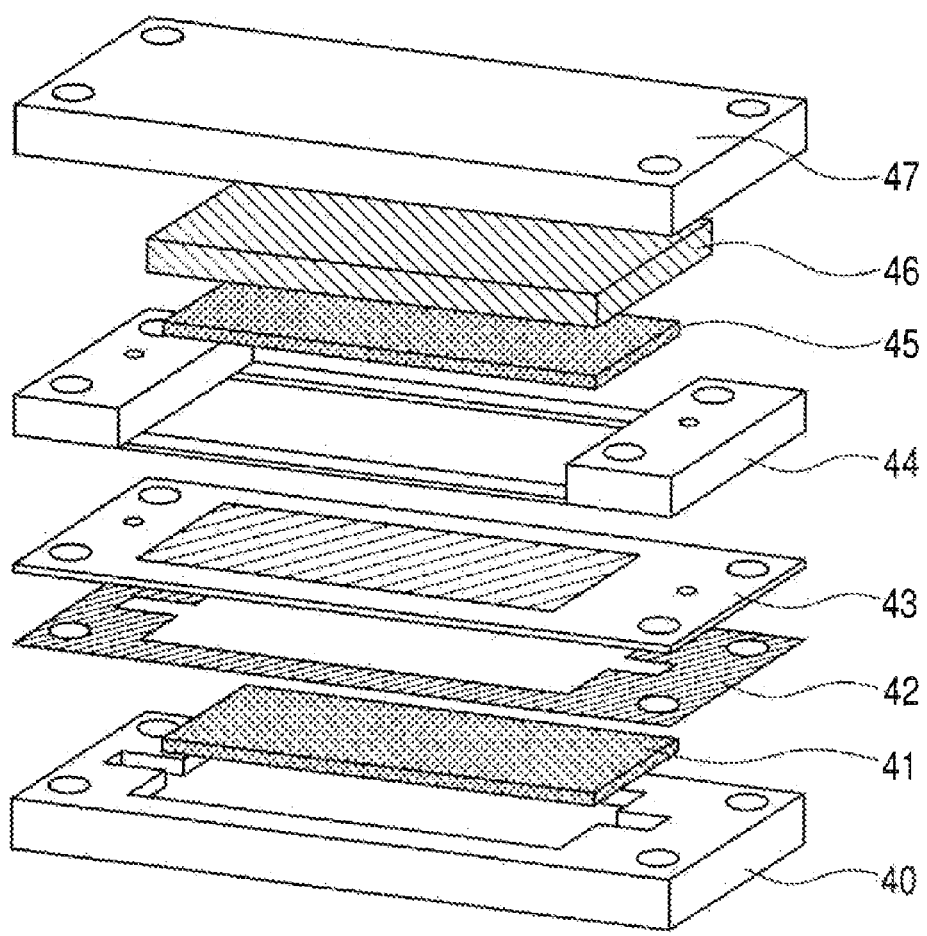
FIG. 9 is a schematic diagram illustrating a structure of a fuel cell unit according to Example 1 of the present invention.

In Example 1, a description is made of an example of an activation treatment for a fuel cell unit of an atmosphere open type, in which hydrogen is supplied as a fuel and air is taken in as an oxidizer through natural diffusion. FIG. 8 is a schematic diagram illustrating a structure of the fuel cell system according to this example. FIG. 9 is a schematic view of the structure of the fuel cell unit according to this example.

In FIG. 8, there are illustrated the fuel cell unit 20, the fuel electrode 21, the polymer electrolyte membrane 22, the oxi-dizer electrode 23, the fuel tank 24, the exterior power source 25, the exterior load 26 such as an electronic device, and the switch 27.

In FIG. 9, there are illustrated a membrane electrode assembly 43, carbon cloths 41 and 45, the current collector (fuel electrode) 40, the current collector (oxidizer electrode) 47, a seal material 42, the foamed metal 46, and a support member 44.

In this example, the fuel cell unit as described below is manufactured.

First, 1 g of platinum black powder was added with 1.5 cc of a Nafion alcoholic solution manufactured by DuPont to be mixed therewith to prepare a catalyst slurry. The resultant was spread on and applied to a PTFE sheet, thereby obtaining a catalyst layer. In this case, a platinum carrying amount per unit area of the catalyst layer was about 5 mg/cm$^2$.

Next, the catalyst layers were transferred onto both sides of a polymer electrolyte membrane Nafion 112 (manufactured by DuPont) by hot pressing, and the PTFE sheet was removed to obtain the membrane electrode assembly. An area of the catalyst layers of the manufactured membrane electrode assembly was about 2 cm$^2$.

In the fuel cell unit 20 of this example, while sandwiching the membrane electrode assembly 43, there were arranged, on a fuel electrode side, the current collector 40, the carbon cloth 41 and the seal material 42, and on an oxidizer electrode side, the carbon cloth 45, the foamed metal 46, the support member 44 and the current collector 47. In this case, the carbon cloths 41 and 45 were gas diffusion layers, and the foamed metal 46 was a flow path forming member for taking air in from side surfaces of the fuel cell unit. Further, the support member 44 was opposed to the seal material 42 and uniformly applied a fastening pressure to the seal material, thereby ensuring sealing of the fuel electrode. Further, the current collector 40, the seal material 42, the membrane electrode assembly 43, the support member 44, and the current collector 47 had bolt holes. Those members were stacked on each other while being positioned with respect to each other and the current collectors 40 and 47 were fastened and insulated by bolts and an insulating member (not shown).

The manufactured fuel cell unit 20 was installed in an environmental test apparatus controlled to have a temperature of 25° C. and a humidification of 50%. To the oxidizer electrode 23, air in an environmental atmosphere was supplied through natural diffusion, and to the fuel electrode 21, dry hydrogen was supplied.

First, the fuel cell unit 20 was driven by controlling the exterior power source 25 in the following manner, and by the feature of inverse diffusion of water produced in the oxidizer electrode 23, the polymer electrolyte membrane 22 was humidified. In a driving, a voltage between the opposite electrodes of the fuel cell was reciprocatingly swept at a speed of 10 mV/sec from an open circuit voltage to 0 V, and humidification and electrification with the limiting current were performed. A magnitude of the limiting current allowed to flow was about 700 mA/cm$^2$. The driving was repeated four times.

To the fuel cell unit 20 which has been humidified, as the activation treatment, −0.3 V was applied for 1 minute by the exterior power source 25 as a potential of the oxidizer electrode 23 with respect to the fuel electrode 21. At the time of activation treatment, by the switch 27, the fuel cell unit 20 was switched from the connection with the exterior load 26 to the connection with the exterior power source 25.

At the time of activation treatment, in the oxidizer electrode 23, besides the water production reaction, the hydrogen production reaction was occurred. Accordingly, a current equal to or larger than the limiting current of the fuel cell was allowed to flow. A magnitude of the flowing current was about 1600 mA/cm$^2$, and a current almost twice the limiting current could be allowed to flow.

Figure 10:
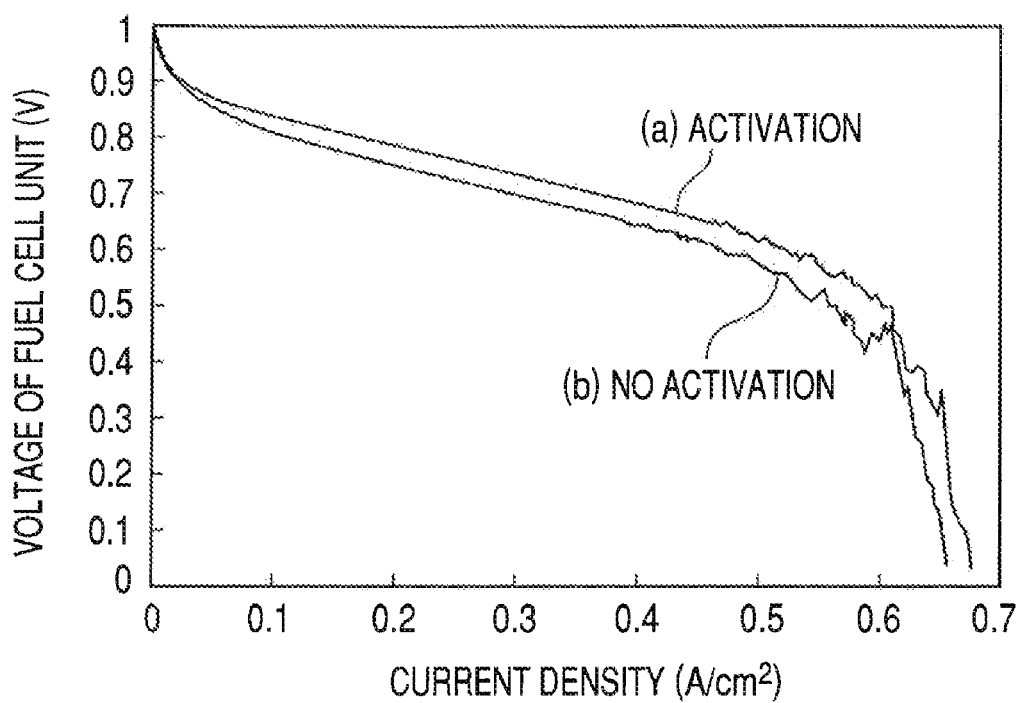
FIG. 10 is a graph for illustrating characteristics after activation of the fuel cell unit according to Example 1 of the present invention.

In FIG. 10, characteristics of the fuel cell unit 20 in which the activation treatment was performed are illustrated in comparison with characteristics of the fuel cell unit 20 in which the activation treatment was not performed. In FIG. 10, current-voltage characteristics of the fuel cell unit 20 in which the activation treatment was performed is denoted by reference symbol (a) and current-voltage characteristics of the fuel cell unit 20 in which the activation treatment was not performed is denoted by reference symbol (b).

By performing the activation treatment, characteristics of the fuel cell unit could be enhanced in a wide range of current.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-157610 filed Jun. 14, 2007 which is hereby incorporated by reference herein in its entirety.

The invention claimed is:

1. An activation method for a fuel cell, which performs power generation by supplying an oxidizer to an oxidizer electrode provided on one surface of a polymer electrolyte membrane and supplying a fuel to a fuel electrode provided on another surface thereof, respectively, the activation method comprising performing an activation treatment including applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and passing a current larger than a maximum current generated at a time of steady operation of the fuel cell, wherein, in the oxidizer electrode at the time of the activation treatment, production of water by a fuel cell reaction and the hydrogen production reaction occur at the same time.

2. An activation method for a fuel cell, which performs power generation by supplying an oxidizer to an oxidizer electrode provided on one surface of a polymer electrolyte membrane and supplying a fuel to a fuel electrode provided on another surface thereof, respectively, the activation method comprising:

performing an activation treatment including applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and passing a current larger than a maximum current generated at a time of steady operation of the fuel cell; and humidifying the polymer electrolyte membrane before the activation treatment is performed by water produced by a fuel cell reaction.

3. A manufacturing method for a fuel cell, which performs power generation by supplying an oxidizer to an oxidizer electrode provided on one surface of a polymer electrolyte membrane and supplying a fuel to a fuel electrode provided on another surface thereof, respectively, forming the oxidizer electrode on the one surface of the polymer electrolyte membrane and forming the fuel electrode on the other surface of the polymer electrolyte membrane; and the method comprising performing an activation treatment including applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and passing a current larger than a maximum current generated at a time of steady operation of the fuel cell, wherein, in the oxidizer electrode at the time of the activation treatment, production of water by a fuel cell reaction and the hydrogen production reaction occur at the same time.

4. A manufacturing method for a fuel cell, which performs power generation by supplying an oxidizer to an oxidizer electrode provided on one surface of a polymer electrolyte membrane and supplying a fuel to a fuel electrode provided on another surface thereof, respectively, the method comprising:

forming the oxidizer electrode on the one surface of the polymer electrolyte membrane and forming the fuel electrode on the other surface of the polymer electrolyte membrane; and performing an activation treatment including applying a voltage of a reverse polarity between the oxidizer electrode and the fuel electrode, the voltage being sufficient for causing a hydrogen production reaction in the oxidizer electrode while maintaining a state of supplying a fuel to the fuel electrode, and passing a current larger than a maximum current generated at a time of steady operation of the fuel cell; and humidifying the polymer electrolyte membrane before the activation treatment is performed by water produced by a fuel cell reaction.

* * * * *

UNITED STATES PATENT AND TRADEMARK OFFICE
CERTIFICATE OF CORRECTION

PATENT NO. : 7,955,745 B2
APPLICATION NO. : 12/594012
DATED : June 7, 2011
INVENTOR(S) : Yamamoto It is certified that error appears in the above-identified patent and that said Letters Patent is hereby corrected as shown below:

COLUMN 18:

Line 39, "membrane; and" should read --membrane;--.

Signed and Sealed this
Twentieth Day of September, 2011

David J. Kappos
*Director of the United States Patent and Trademark Office*